United States Patent [19]

Yates et al.

[11] 4,236,386
[45] Dec. 2, 1980

[54] FIBER REINFORCED COMPOSITE SHAFT WITH METALLIC CONNECTOR SLEEVES MOUNTED BY A POLYGONAL SURFACE INTERLOCK

[75] Inventors: Derek N. Yates, Los Gatos; John C. Presta, San Jose, both of Calif.

[73] Assignee: Celanese Corporation, New York, N.Y.

[21] Appl. No.: 43,557

[22] Filed: May 29, 1979

[51] Int. Cl.³ .................. A44C 13/00; B65H 81/00; F16L 9/00

[52] U.S. Cl. .................. 64/1 S; 138/109; 156/172; 156/173; 156/187; 156/188; 156/189; 156/190; 428/36

[58] Field of Search .......... 156/172, 173, 187, 188, 156/189, 190; 138/109; 64/1 R, 1 S, 1 C; 428/36

[56] References Cited

U.S. PATENT DOCUMENTS

| | | | |
|---|---|---|---|
| 2,882,072 | 4/1959 | Noland | 285/114 |
| 3,202,560 | 8/1965 | Michael | 156/177 |
| 3,231,442 | 1/1966 | Michael | 156/175 |
| 3,661,670 | 5/1972 | Pierpont, Jr. | 156/172 |
| 4,041,599 | 8/1977 | Smith | 156/295 |
| 4,089,190 | 5/1978 | Worgan et al. | 64/1 S |
| 4,171,626 | 10/1979 | Yates et al. | 64/1 R |
| 4,187,135 | 2/1980 | Yates et al. | 138/109 |

*Primary Examiner*—William R. Dixon, Jr.
*Attorney, Agent, or Firm*—Kenneth A. Genoni

[57] ABSTRACT

A tubular fiber reinforced composite shaft is formed by providing a metal sleeve having a plurality of circumferentially straight surface segments on the outer periphery thereof. The sleeve is positioned upon a segment of a mandrel. Fibrous material bearing a non-solidified resinous material is applied to the mandrel and the circumferentially straight surface segments of the sleeve. The resinous material is solidified with portions thereof lying flush against the circumferentially straight surface segments to create a torsion-transmitting connection with the metal sleeve.

10 Claims, 8 Drawing Figures

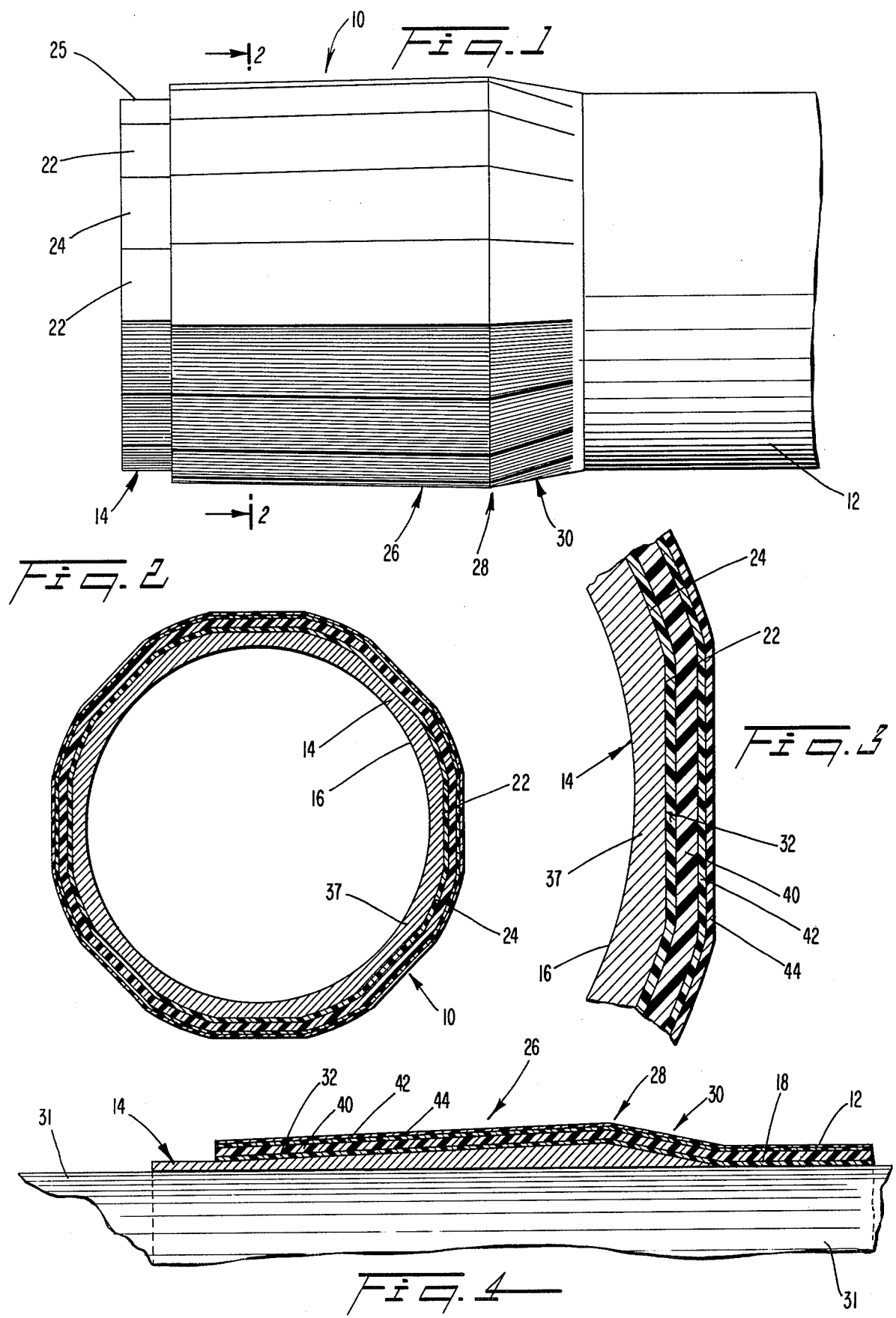

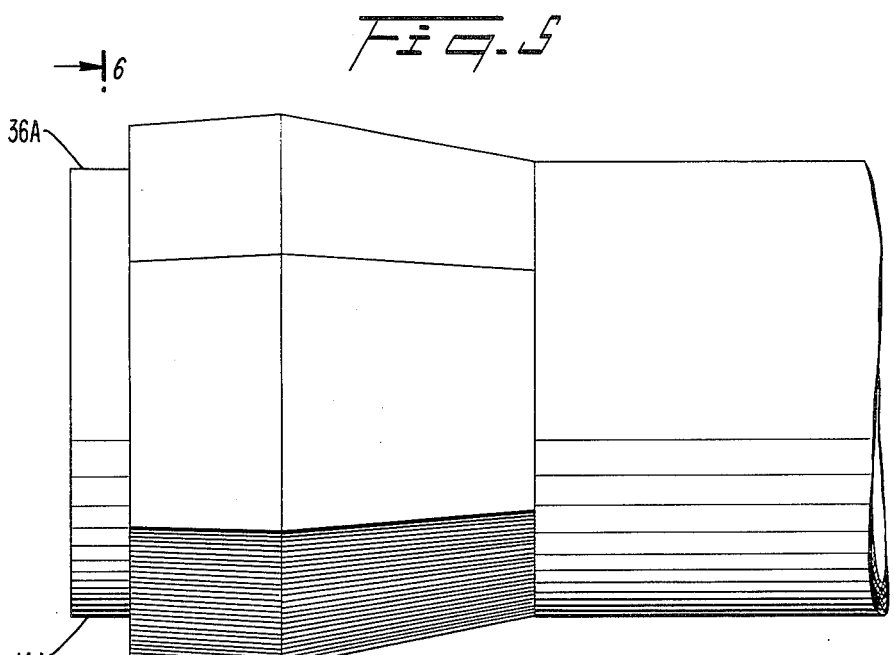
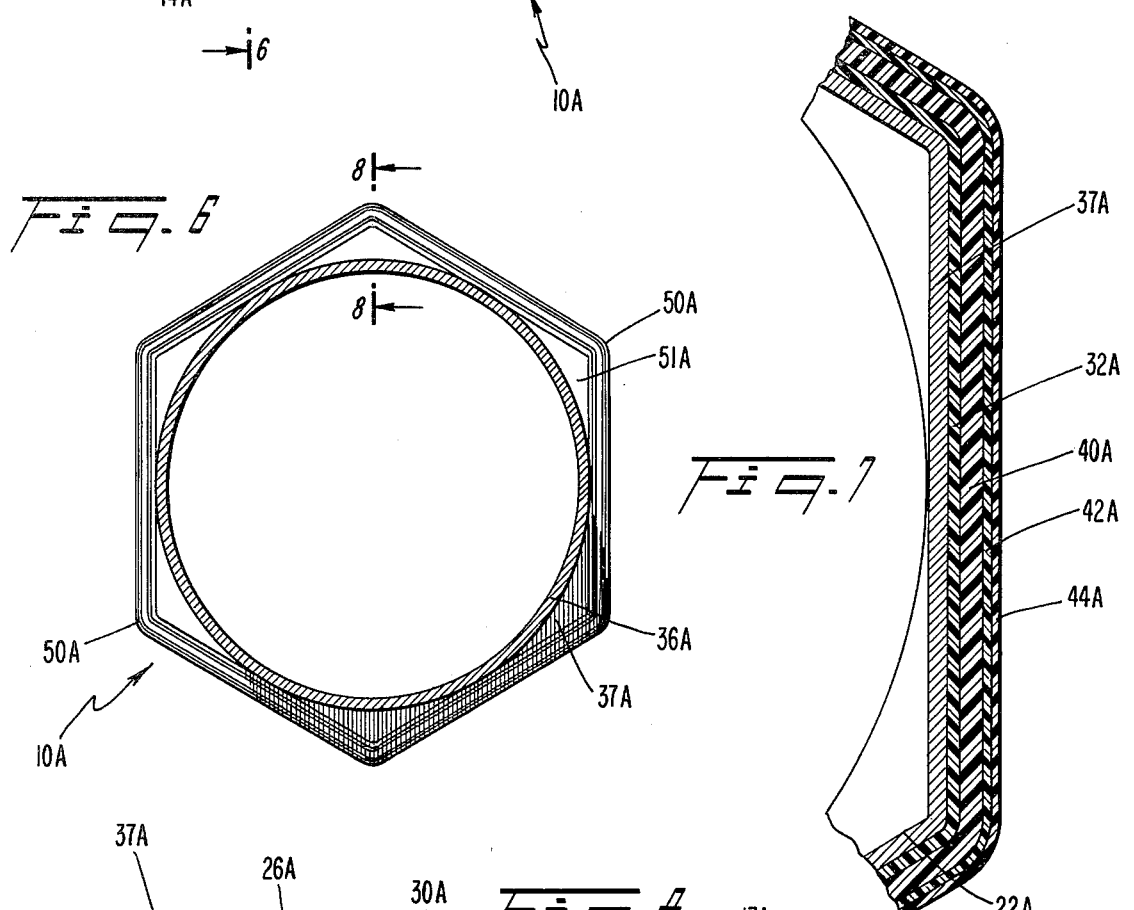
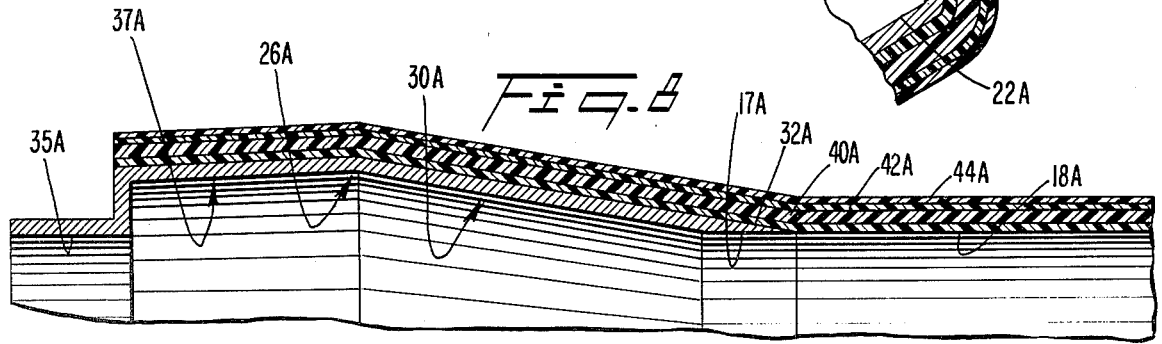

FIBER REINFORCED COMPOSITE SHAFT WITH METALLIC CONNECTOR SLEEVES MOUNTED BY A POLYGONAL SURFACE INTERLOCK

BACKGROUND AND OBJECTS OF THE INVENTION

This invention relates to fiber reinforced composite shafts and, more especially, to vehicle drive shafts comprising a fiber reinforced resinous shaft body with metallic coupling sleeves mounted at the ends thereof.

Tubular fiber reinforced composites have been heretofore proposed, as demonstrated by U.S. Pat. Nos. 2,882,072 issued to Noland on Apr. 14, 1959, and 3,661,670 issued to Pierpont on May 9, 1972, and in British Pat. No. 1,356,393 issued on June 12, 1974. In the Pierpont patent, for example, it has been proposed to form such composites from a resinous material which is reinforced by glass fibers. In particular, filaments bearing a non-hardened resinous material (i.e., an uncured thermosetting resin) are wound around a mandrel until the desired thickness has been established. The reinforcing fibers can be positioned within the wall of the tubular composite in varying angular relationships. Thereafter, the resinous material is solidified (i.e., is cured). A premolded threaded end portion can be mounted at the ends of the tubular composite, such as by the winding process.

It recently has been proposed to form vehicle drive shafts from tubular fiber reinforced composites, as demonstrated by U.S. Pat. No. 4,041,599 issued to Smith on Aug. 16, 1977, and published Japanese Application No. 52-127542, entitled "Carbon Fiber Drive Shaft" which claims priority for the filing of U.S. Ser. No. 676,856 Apr. 14, 1976 of Gordon Peter Worgan et al (now U.S. Pat. No. 4,089,190). In the Japanese application filaments bearing a non-hardened resinous material (e.g., an uncured thermosetting resin) are wound around a mandrel until the desired thickness has been established, whereupon the resinous material is cured. Zones or layers are positioned circumferentially within the wall of the shaft in the specific angular relationships there disclosed.

The above-mentioned Smith patent proposes the attachment of a carbon fiber reinforced epoxy drive shaft directly to a universal joint extension by a specific bonding technique.

Fiber reinforced composite shafts exhibit advantages over metallic shaft, i.e., they are lighter in weight, more resistant to corrosion, stronger, and more inert.

In copending application Ser. No. 890,232 filed Mar. 27, 1978, of Derek N. Yates and David B. Rezin entitled "Improved Carbon Fiber Reinforced Composite Drive Shaft", a fiber reinforced composite drive shaft is disclosed which exhibits improved service characteristics and the necessary strength and durability to withstand the various stresses encountered during vehicle operation. The disclosure of that copending application is herein incorporated by reference as if set forth at length.

Since direct welding or bonding of a resin shaft to metal does not normally create a sufficiently strong and durable connection on a consistent and reliable basis, the use of metallic connector sleeves mounted at the ends of the shaft in accordance with the concept of the present invention provides a means for accomplishing a secure welded connection similar to that utilized with conventional metallic shafts.

The high torque loads which are to be transmitted by a vehicle drive shaft require that an extremely strong and durable torsional drive connection be established between the sleeves and shaft body. Previous proposals for mounting sleeves by employing adhesives or by wrapping the filament bundles around circumferential grooves on the sleeve periphery, cannot be relied upon to provide a connection of the requisite strength and durability.

It is, therefore, an object of the present invention to provide a novel, fiber reinforced resin shaft which minimizes or obviates problems of the types discussed above.

It is an additional object of the invention to provide a novel, fiber reinforced resin shaft suitable for use as a drive shaft in a vehicle power train.

It is a further object of the invention to provide novel methods and apparatus for securing metal connector sleeves to the ends of fiber reinforced resin shafts to enable the shafts to transmit high torsional loads.

BRIEF SUMMARY OF THE INVENTION

These objects are achieved by the present invention which involves a tubular fiber reinforced composite shaft. The shaft is formed by providing a metal sleeve having a plurality of circumferentially straight surface segments on the outer periphery thereof. The sleeve is positioned upon a segment of a mandrel. Fibrous material bearing a non-solidified resinous material applied to the mandrel and the circumferentially straight surface segments of the sleeve. The resinous material is solidified with portions thereof lying flush against the circumferentially straight surface segments to create a torsion-transmitting connection with the metal sleeve.

BRIEF DESCRIPTION OF THE DRAWINGS

The advantages of the present invention will become apparent from the following detailed description of preferred embodiments thereof in connection with the accompanying drawings in which like numerals designate like elements and in which:

FIG. 1 is a side elevational view of one end of a composite shaft according to one preferred embodiment of the present invention;

FIG. 2 is a cross-sectional view taken along line 2—2 of FIG. 1;

FIG. 3 is an enlarged fragmentary view of the cross-sectional view in FIG. 2;

FIG. 4 is a fragmentary longitudinal sectional view of the shaft;

FIG. 5 is a side elevational view of one end of a composite shaft according to a second preferred embodiment of the present invention;

FIG. 6 is a cross-sectional view taken along line 6—6 in FIG. 5;

FIG. 7 is a fragmentary cross-sectional view taken along a portion of a sleeve of the present invention around which fibrous material has been applied; and FIG. 8 is a fragmentary longitudinal sectional view taken along line 8—8 in FIG. 6.

DETAILED DESCRIPTION OF PREFERRED EMBODIMENTS OF THE INVENTION

One preferred form of drive shaft 10 according to the present invention is illustrated in FIGS. 1–4 and comprises a reinforced resin shaft body 12 of cylindrical cross-section, and a metal connector sleeve 14 secured preferably at each end of the shaft body 12.

The connector sleeve 14 is generally cylindrical and formed of an appropriate metal, such as steel or aluminum for example. The sleeve includes an inner annular surface 16 of constant diameter which is substantially contiguous with an inner surface 18 of the shaft body located longitudinally inwardly thereof (FIG. 4).

The outer peripheral surface of the sleeve 14 is of polygonal cross-sectional configuration, comprising a plurality of circumferentially spaced surface segments 22 which are straight or flat in the circumferential direction (FIGS. 2, 3) and extend generally longitudinally along the sleeve. Preferably, the circumferentially flat surface segments 22 extend from the outermost end to the innermost end of the sleeve.

The flat surface segments 22 are separated by curvalinear segments 24 which are concentric relative to the inner surface 16 of the sleeve.

If desired, all of the surface segments 22, 24 could be of circumferentially flat shape rather than merely the segments 22.

Each of the surface segments 22, 24 is inclined in a direction extending longitudinally inwardly and radially outwardly along an outer longitudinal extent or portion 26 of the sleeve to an intermediate location 28 of the sleeve. From there, the surface segments 22, 24 are each inclined in a direction extending longitudinally and radially inwardly along an inner longitudinal extent or portion 30 of the sleeve. The inner portion 30 extends to the longitudinally innermost end of the sleeve.

During fabrication of a preferred form of the shaft, a pair of connector sleeves 14 are positioned on a mandrel 31 (only one sleeve shown in FIG. 4) in longitudinally spaced relationship. The sleeves 14 engage the mandrel somewhat snugly, but loosely enough to be removable therefrom. An appropriate clamping arrangement holds the sleeves 14 in place. The mandrel is coated with a release substance to resist the adherence thereto of resin or adhesives. Thereafter, the shaft body 12 is formed around both the mandrel and sleeve.

Construction of the shaft body is preferably performed in a manner more fully described in the aforementioned application of Yates and Rezin. Summarized briefly, layers of fiber reinforced resin-impregnated material are applied, preferably in the form of bundles of substantially parallel continuous filaments bearing a non-solidified (i.e., liquid, soft and tacky, or molten) resinous material. The bundles can be dipped in an uncured liquid thermosetting resin, such as an epoxy resin, and then wound around the mandrel in multiple passes until a layer of desired thickness is established.

Attention is further directed to U.S. Pat. Nos. 3,661,670, 3,202,560 and 3,231,442 for additional details concerning possible arrangements for the clamping of sleeves and winding of filament bundles. The disclosures of these patents are incorporated herein by reference as if set forth at length.

The term "layer" as used herein specifies a circumferential zone within the wall of the tubular drive shaft wherein the fibrous reinforcement is disposed in a specific configuration and differs from the adjacent zone(s) with respect to the configuration and/or composition of the fibrous reinforcement. A single layer may include a multiple pass alignment or buildup of fibrous reinforcement in a given configuration. The term layer encompasses an alignment wherein the fibrous reinforcement is disposed therein at both plus and minus a given angle which optionally can be built-up in multiple passes.

The fibers reinforce the thermoset resin matrix to impart necessary properties of strength and durability to the shaft. In this regard, glass fibers (e.g., E-glass or S-glass) and carbon fibers (i.e., either amorphous or graphitic) materials are preferred. The carbon fibers commonly contain at least 90 percent carbon by weight, and preferably at least 95 percent carbon by weight. Additionally preferred carbon fibers have a Young's modulus of elasticity of at least 25 million psi (e.g., approximately 30 to 60 million psi).

The plies of filament bundles are wound in various orientation relative to the longitudinal axis of the drive shaft, and can be built up to different thicknesses, respectively. Preferably, an initial layer of glass fibers is applied at an angle of from $\pm 30°$ to $\pm 50°$ relative to a line parallel to the longitudinal axis of the shaft. Next, a layer of glass fibers is applied at an angle of from 0° to $\pm 15°$. Thereafter, a layer of carbon fibers is applied at an angle of from 0° to $\pm 15°$. Then a layer of glass fibers is applied at about an angle of from about $\pm 60°$ to 90°.

Of course the number and composition of layers, as well as their orientation and thickness may vary, depending upon the characteristics desired to be imparted to the shaft.

Rather than utilizing filament winding (e.g., wet winding or prepeg winding), other tube forming procedures can be employed, such as tube rolling, tape wrapping, or pultrusion, for example. In the former step, comparatively wide sections of resin impregnated tape are precut to patterns, stacked in sequence, and rolled onto the mandrel.

After the layers have been applied, the non-solidified resin is cured. In this regard, the resin may be of a self-curing type, or may be of a kind which cures in response to being subjected to heat and/or curing agent.

Relating more particularly to the preferred embodiment depicted in FIGS. 1-4 the sleeve(s) 14 is positioned on the mandrel 31. Thereafter, an initial layer 32 of glass fibers is recorded around the mandrel and sleeves at about a $\pm 45°$ angle. This layer overlies all of the longitudinal inner portion 30 of the sleeve and at least a substantial portion of the longitudinal outer portion 26. As the initial fibers are wound, they follow the periphery of the sleeve. That is, the fibers contact and rest flush against the flat and curved surface segments 22, 24 as illustrated in FIG. 3. Thus, the layer 32 of fibers assumes a cross-sectional configuration similar to that of the sleeve, i.e., alternating flat and curved segments are produced.

Thereafter, a layer 40 of glass fibers is wound around the layer 32 at about a zero degree angle. The fibers of this layer 40 follow the contour of the previously applied layer 32 and form alternating flat and curved surface segments.

Next, a layer 42 of graphite fibers is wound around the layer 40 at about a 0° angle.

Finally, a layer 44 of glass fibers is wound around at about a 90° angle around the layer 42.

The layer 42 assumes the profile of the layer 40, and the layer 44 assumes the profile of the layer 42.

It will be understood that any number of layers can be applied and at various angles and thicknesses, depending upon desired shaft characteristics.

Thereafter, the non-solidified resin is cured to bond the layers together to form an integral composite, and the shaft is removed from the mandrel 31.

An axially outer portion 25 of the sleeve 14 is exposed, preferably by removing portions of the layers.

It will be appreciated that the sleeve 14 and shaft body 12 are mechanically joined together for common rotation, so that torsional forces can be transmitted therebetween. Relative rotation between the sleeve 14 and the shaft body 12 is prevented by the straight interface between the flat segments 22 and the initial layer 32. That is, the corner 50 formed at the juncture between adjacent segments 22 and 24 cannot rotate relative to that portion of the initial layer 32 abutting the segment 22.

Relative longitudinal movement between the sleeve 14 and the shaft body 12 is prevented by the double taper formed by the inclined portions 26, 30 of the sleeve which are encompassed by the windings.

The sleeves 14 facilitate connection of the shaft to metal components such as metal yokes in a vehicle power train, since direct metal-to-metal welding contact is possible.

Although not necessary, it might be desirable to apply an adhesive between the sleeve 14 and initial layer 32 of the fibrous material to augment the connection therebetween.

Another preferred embodiment of the invention is illustrated in FIGS. 5–8. A drive shaft 10A includes a sleeve 14A having a longitudinal outermost portion 36A of cylindrical configuration, i.e., circular cross-section, and a longitudinal inner portion 37A of hexagonal cross-sectional configuration. The side segments 22A of the inner portion 37A are straight in the circumferential and longitudinal directions.

The diameter of the outer portion 36A is less than the distance between diagonally opposed common edges 50A of the adjoining side segments, thereby forming radial shoulders 51A at those areas.

The outer peripheral surface of the inner portion 37A of the sleeve(s) 14A forms a double taper somewhat similar to that of the peripheral surface of the earlier described embodiment in FIGS. 1–4. That is, a longitudinal outer extent 26A of each surface segment 22A is inclined in a direction extending longitudinally inwardly and radially outwardly, to an intermediate location 28A on the sleeve. A longitudinally inner extent 30A of each surface segment 22A is inclined in a direction extending longitudinally and radially inwardly from the intermediate location 28A to the longitudinally innermost end of the sleeve.

The internal surface 17A of the longitudinal innermost end of the sleeve is of cylindrical shape and is aligned with a cylindrical internal surface 35A of the outer portion 36A of the sleeve, and is also aligned with the inner surface 18A of the shaft body 12.

Fabrication of the shaft body is performed in a manner similar to that described earlier in connection with the embodiment of FIGS. 1–4. The sleeve(s) 14A is mounted on a mandrel (not shown) and is supported thereon by the surfaces 35A, 17A. Then four layers 32A, 40A, 42A and 44A of fibers are applied to the mandrel and to the outer peripheral surface of the inner portion 37A of the sleeve(s) 14A. The fibers preferably completely encompass the inner and outer extents 30A, 26A of the sleeve(s) 14A. The first layer 32A of fibers conforms to the hexagonal configuration of the sleeve and the subsequently applied layers 40A, 42A, 44A of fibers conform to the shape of the previously applied layer. Thus, the shaft body 12 surrounding the sleeve(s) 14A is of hexagonal cross-section.

The hexagonally shaped interface between shaft body 12A and the sleeve(s) 14A forms a mechanical interlock which transmits torsional forces therebetween. Moreover, the double taper formed by the inclined extents 26A, 30A of the outer periphery of the sleeve prevents relative longitudinal movement between the sleeve(s) 14A and the shaft body 12A. Thus, a highly secure, force-transmitting connection is established between those components.

The sleeve(s) 14A facilitate connection of the shaft to metal components such as metal yokes in a vehicle power train, since direct metal-to-metal welding contact is possible.

Although not necessary, it might be desirable to apply an adhesive between the sleeve(s) 14A and initial layer 32A of fibrous material to augment the connection therebetween.

Although the mechanical lock concept of the present invention is disclosed in conjunction with a particular shaft body, it is to be understood that this concept has utility with composite shafts in general wherein fibrous reinforcement is present in a resinous matrix material.

The principles, preferred embodiments and modes of operation of the present invention have been described in the foregoing specification. The invention which is intended to be protected is not, however, to be construed as limited to the particular forms disclosed, since these are to be regarded as illustrative rather than restrictive. Variations and changes may be made by those skilled in the art without departing from the spirit and scope of the present invention.

What is claimed is:

1. A method of forming a tubular fiber reinforced composite shaft comprising the steps of:
   providing a metal sleeve having a plurality of circumferentially straight surface segments on the outer periphery thereof;
   positioning said metal sleeve upon a segment of a mandrel;
   applying fibrous material bearing a non-solidified resinous material to said mandrel and over said circumferentially straight surface segments of said sleeve;
   solidifying said resinous material with portions thereof lying flush against said circumferentially straight surface segments to create a torsion transmitting connection with said metal sleeve; and
   removing said mandrel.

2. A method according to claim 1 wherein said providing step further comprises providing a metal sleeve having an outer periphery including a first longitudinal portion incline in a direction extending longitudinally inwardly and radially outwardly and a second longitudinal portion disposed longitudinally inwardly of said first portion and inclined in a direction extending longitudinally and radially inwardly, said applying step includes applying said fibrous material to both of said portions of said sleeve such that relative longitudinal movement between said sleeve and said fibrous material is prevented.

3. A method according to claim 1 wherein said providing step further comprises providing a metal sleeve including a plurality of curvalinear surface segments between said straight surface segments.

4. A method according to claim 1 wherein said providing step further comprises providing a metal sleeve including a portion which is hexagonal in cross-section, said applying step including applying said fibrous material to said hexagonal portion.

5. A method according to claim 1 wherein said fibrous material is applied in a manner leaving the longitudinally outermost end of said sleeve exposed.

6. A tubular fiber reinforced composite shaft comprising:
- a shaft body comprising a plurality of integrally bonded circumferential plies of solidified fiber reinforced resinous material; and
- a metal sleeve mounted in at least one end of said shaft body, said sleeve including a plurality of circumferentially straight surface segments on the outer periphery thereof;
- said fibrous material lying flush against said straight surface segments to form a torsion transmitting connection therebetween.

7. A shaft according to claim 6 wherein said circumferentially straight surface segments each include a first longitudinal portion inclined in a direction extending longitudinally inwardly and radially outwardly, and a second longitudinal portion disposed longitudinally inwardly of said first portion and inclined in a direction extending longitudinally and radially inwardly, said fibrous material being disposed around said first and second portions to prevent relative longitudinal movement between said sleeve and said fibrous material.

8. A shaft according to claim 6 wherein said outer periphery of said shaft includes circumferentially curved surface segments between said circumferentially straight surface segments.

9. A shaft according to claim 6 wherein at least a portion of said shaft disposed within said fibrous material is of hexagonal cross-section, the six sides thereof forming said circumferentially straight surface segments.

10. A shaft according to claim 6 wherein said fibrous material terminates short of the longitudinally outermost end of said shaft to leave a portion of the latter exposed.

* * * * *